US011513203B2

(12) United States Patent
Schumann et al.

(10) Patent No.: US 11,513,203 B2
(45) Date of Patent: Nov. 29, 2022

(54) OPERATING METHOD AND CONTROL UNIT FOR AN ULTRASOUND TRANSCEIVER DEVICE, ULTRASOUND TRANSCEIVER DEVICE AND WORKING APPARATUS (71) Applicant: Robert Bosch GmbH, Stuttgart (DE)

(72) Inventors: Michael Schumann, Stuttgart (DE); Dirk Schmid, Simmozheim (DE); Thomas Treptow, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 16/609,373

(22) PCT Filed: May 7, 2018

(86) PCT No.: PCT/EP2018/061641
§ 371 (c)(1),
(2) Date: Oct. 29, 2019

(87) PCT Pub. No.: WO2018/206476
PCT Pub. Date: Nov. 15, 2018

(65) Prior Publication Data
US 2020/0057152 A1 Feb. 20, 2020

(30) Foreign Application Priority Data
May 8, 2017 (DE) .......................... 102017207679.8

(51) Int. Cl.
*G01S 7/52* (2006.01)
*B06B 1/02* (2006.01)
(Continued)

(52) U.S. Cl.
CPC ........ *G01S 7/52004* (2013.01); *B06B 1/0215* (2013.01); *G01S 7/524* (2013.01);
(Continued)

(58) Field of Classification Search
CPC ...... G01S 7/52004; G01S 7/524; G01S 7/527; G01S 15/931; B06B 1/0215; G10K 11/002
See application file for complete search history.

(56) References Cited

FOREIGN PATENT DOCUMENTS

DE 10136628 A1 2/2003
DE 10025989 A1 * 5/2003 ........... H04B 7/0626
(Continued)

OTHER PUBLICATIONS

International Search Report for PCT/EP2018/061641, dated Jul. 26, 2018.

*Primary Examiner* — Isam A Alsomiri
*Assistant Examiner* — Abdallah Abulaban
(74) *Attorney, Agent, or Firm* — Norton Rose Fulbright US LLP; Gerard Messina (57) ABSTRACT

An operating method for an ultrasound transceiver device, where the ultrasound transceiver device is alternately and, in particular alternatingly operated in a transmit mode and in a receive mode; subsequently to a transmit mode and/or prior to a receive mode, the ultrasound transceiver device is actively damped by the action of a sequence of counter control pulses; a phase position and/or a damping energy are/is iteratively determined or adapted via a training by a measure of the damping success at least temporarily assuming or approaching an at least locally optimal value.

13 Claims, 11 Drawing Sheets (51) Int. Cl.
  *G01S 7/524*      (2006.01)
  *G01S 7/527*      (2006.01)
  *G01S 15/931*     (2020.01)
  *G10K 11/00*      (2006.01)

(52) U.S. Cl.
  CPC ............ *G01S 7/527* (2013.01); *G01S 15/931* (2013.01); *G10K 11/002* (2013.01)

(56)           References Cited

FOREIGN PATENT DOCUMENTS

| DE | 102009027221 A1   | 12/2010 |              |
|----|-------------------|---------|--------------|
| DE | 102010039017 A1 * | 2/2012  | ............ H04R 3/002 |
| DE | 102010039017 A1   | 2/2012  |              |
| DE | 102012213712 A1   | 2/2014  |              |
| DE | 102014107311 A1   | 11/2015 |              |
| EP | 2693231 A1        | 2/2014  |              |
| JP | 2012181149 A      | 9/2012  |              |
| JP | 2015190817 A      | 11/2015 |              |
| WO | 2014166835 A1     | 10/2014 |              |
| WO | WO-2014166835 A1 *| 10/2014 | ........... G01S 15/931 |

\* cited by examiner

OPERATING METHOD AND CONTROL UNIT FOR AN ULTRASOUND TRANSCEIVER DEVICE, ULTRASOUND TRANSCEIVER DEVICE AND WORKING APPARATUS

FIELD

The present invention relates to an operating method and a control unit for an ultrasound transceiver device, an ultrasound transceiver device as such, as well as to a working apparatus and, in particular a vehicle.

BACKGROUND INFORMATION

Ultrasound transceiver devices are increasingly being used in the sector of mobile working apparatuses and, in particular in the vehicle sector. They are often used for detecting the environment, for example, to avoid collisions with objects located in the environment of a working apparatus and, in particular of a vehicle.

Operating methods that involve active damping are increasingly being used in the operation of ultrasonic transducers as transmitting and receiving elements. Additional measures are often needed for this purpose, however, and implementing the same requires suitable aggregates, with whose assistance, parameters for controlling counter pulses for the damping are adapted using appropriate measurement and control processes to achieve a best possible damping success. This entails increased expenditure for equipment and process engineering, operating parameters of the oscillating system, such as amplitude or phase position, being determined in advance and monitored.

SUMMARY

An example operating method according to the present invention for an ultrasound transceiver device may have the advantage of reliably making an active damping possible using simple means and without knowledge of the specific oscillatory characteristics of the oscillating system of an underlying ultrasound transceiver device. This is achieved in accordance with an example embodiment of the present invention by providing an operating method for an ultrasound transceiver device where (i) the ultrasound transceiver device is alternately and, in particular alternatingly operated in a transmit mode and in a receive mode; (ii) subsequently to a transmit mode and/or prior to a receive mode, the ultrasound transceiver device (1) is actively damped by the action of a sequence of counter control pulses; (iii) a phase position and/or a damping energy of the sequence of counter control pulses are/is iteratively determined or adapted via a training (iv) by a measure of the damping success at least temporarily assuming or approaching an at least locally optimal value.

Preferred embodiments of the present invention are described herein.

The operating method according to the present invention may be especially advantageous when, in accordance with a preferred embodiment, the phase position of the sequence of counter control pulses is determined or adapted by specifying or adapting a time interval between an end of a control pulse of the transmit mode that is the last to be emitted in the particular case and a beginning of an immediately following counter control pulse.

The damping energy of the sequence of counter control pulses may be determined, specified and/or adapted.

In an especially advantageous further refinement of the operating method according to the present invention, the damping energy is determined or adapted by specifying or adapting the number, duration and/or amplitude of the counter control pulses to be output or output during active damping, in particular by specifying or adapting the characteristic and/or the amplitude of an electric voltage and/or of an electric current intensity that excites an oscillating element of the underlying ultrasound transceiver device.

In another embodiment of the operating method according to the present invention, especially simple conditions arise when the damping energy is determined or adapted by specifying or adapting the pulse width of a counter control pulse that is the last to be emitted during active damping.

A further simplification is possible when, in accordance with another embodiment of the inventive operating method, in response to a counter control pulse disappearing that is the last to be emitted or the last emitted during active damping, the pulse width is reduced to further determine or adapt the damping energy by specifying or adapting the pulse width of a counter control pulse that is the next-to-last to be emitted or the next-to-last emitted.

Also, with regard to determining the damping success in the case of active damping, different concepts may be implemented.

In a preferred embodiment of the operating method according to the present invention, a measure of the damping success is determined over a time interval from the instant of the end of a last control pulse until the instant the amplitude of oscillation for the ultrasound transceiver device decays below a predefined threshold value, in particular as the result of minimization and/or optimization.

It is alternatively or additionally possible that, in accordance with another advantageous embodiment of the operating method according to the present invention, a measure of the damping success is ascertained by determining an integral below a or of an oscillation signal or of the envelope of the oscillation signal of the ultrasound transceiver device and, in particular of an oscillating element of the underlying ultrasound transceiver device, from a starting instant to an ending instant, at which value of the oscillation signal or of the envelope of the oscillation signal, a predefined threshold value is not reached, in particular due to minimization and/or optimization.

The training method as such likewise offers many ways for adapting the operating method according to the present invention.

Thus, it may be provided that a training be performed at a first start of the underlying ultrasound transceiver device and/or at a renewed start following an interruption of operation or following an operating pause of the underlying ultrasound transceiver device.

Even if a training had already been performed in an operating method for an ultrasound transceiver device, further advantages are derived when—in accordance with another embodiment—following a training and, in particular during operation of the underlying ultrasound transceiver device, the phase position and/or the damping energy are/is readjusted as damping parameter(s) in a control operation.

A training and/or a control operation may be executed by specifying or adapting the phase position and/or the damping energy as damping parameter(s), initially by a coarse adjustment and subsequently optionally by a fine adjustment, respectively;

specifying or adapting the phase position and/or the damping energy as damping parameter(s) through interval halving in a search window within the particular parameter range;

specifying or adapting the phase position and/or the damping energy as damping parameter(s) in a fixed adaptation direction, initially by positive or negative incrementation and, subsequently, by negative or positive incrementation in a search window within the particular parameter range;

and/or determining and checking the measure of the damping success following each specification or adaptation of the phase position and/or of the damping energy as damping parameter(s).

The present invention also relates to a control apparatus for an ultrasound transceiver device that is adapted for implementing an operating method for an ultrasound transceiver device in accordance with the present invention.

An ultrasound transceiver device having a control device devised in accordance with the present invention is also an object of the present invention.

Finally, the present invention also relates to a working apparatus and, in particular to a vehicle that is designed to include an ultrasound transceiver device devised in accordance with the present invention for recording an environment of the working apparatus, respectively of the vehicle.

BRIEF DESCRIPTION OF EXAMPLE EMBODIMENTS

Specific embodiments of the present invention are described in detail with reference to the enclosed figures.

DETAILED DESCRIPTION OF EXAMPLE EMBODIMENTS

Exemplary embodiments of the present invention and the technical background are described in detail in the following with reference to FIG. 1 through 11. Same and equivalent, as well as same or functionally equivalent elements and components are denoted by the same reference numerals. The designated elements and components are not described in detail at every instance thereof.

The illustrated features and further properties may be isolated from one another in any form or combined with one another in any way desired without departing from the spirit and scope of the present invention.

Figure 1:
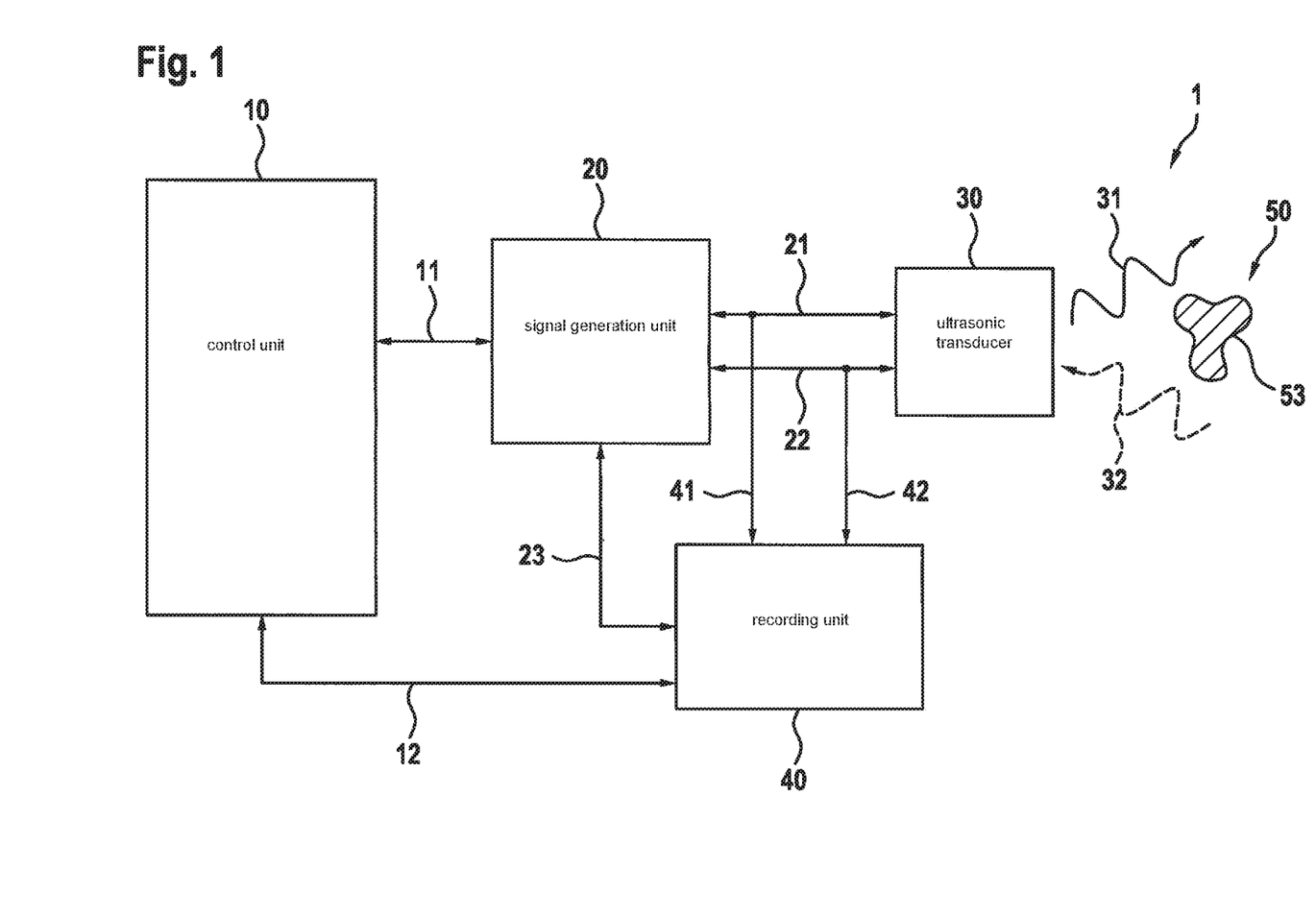
FIG. 1 is a schematic representation of an ultrasound transceiver device designed in accordance with the present invention, as a type of block diagram.

FIG. 1 is a schematic representation which, as a type of block diagram, shows an ultrasound transceiver device 1 designed in accordance with the present invention.

This ultrasound transceiver device 1 features (i) a control unit 10 that is adapted for implementing a specific embodiment of the operating method according to the present invention; (ii) a signal generation unit 20; (iii) an ultrasonic transducer 30 that may also be understood as an oscillatory element and/or as a sensor; as well as (iv) a recording unit 40, the latter being adapted for recording the amplitude of ultrasonic transducer 30 as an oscillatory system in order to determine the measure of a damping success.

Control unit 10 is connected via a first recording and control line 11 to signal generation unit 20 and via a second recording and control line 12 to recording unit 40 in order to record the state thereof and control the operation thereof. Via first to third recording and control lines 21, 22 and 23, signal generation unit 20 is connected on the one hand to ultrasonic transducer 30 and, on the other hand, to recording unit 40. First and second recording and control lines 21, respectively 22 are thereby used in the transmit mode for controlling ultrasonic transducer 30 as a transmitter for generating and emitting primary sound 31 into an environment 50, and, on the other hand, in the receive mode for recording received signals derived from secondary sound 32 received from ultrasonic transducer 30. Secondary sound 32 may include, inter alia, sound reflected off of an object 53 in environment 50, thus an echo of object 53.

In accordance with the present invention, subsequently to a transmit mode or to a portion thereof, in which transmit pulses in the form of primary sound 31 are emitted by ultrasonic transducer 30, control unit 10 is adapted to induce signal generation unit 20 to generate corresponding counter control pulses and route them to ultrasonic transducer 30 in order to damp the oscillation state originating from the transmit mode.

Via first and second recording and control lines 41 and 42, recording unit 40 may record this oscillation state of ultrasonic transducer 30 in order to be able to assess the damping success by the action of counter control pulses.

Figure 2:
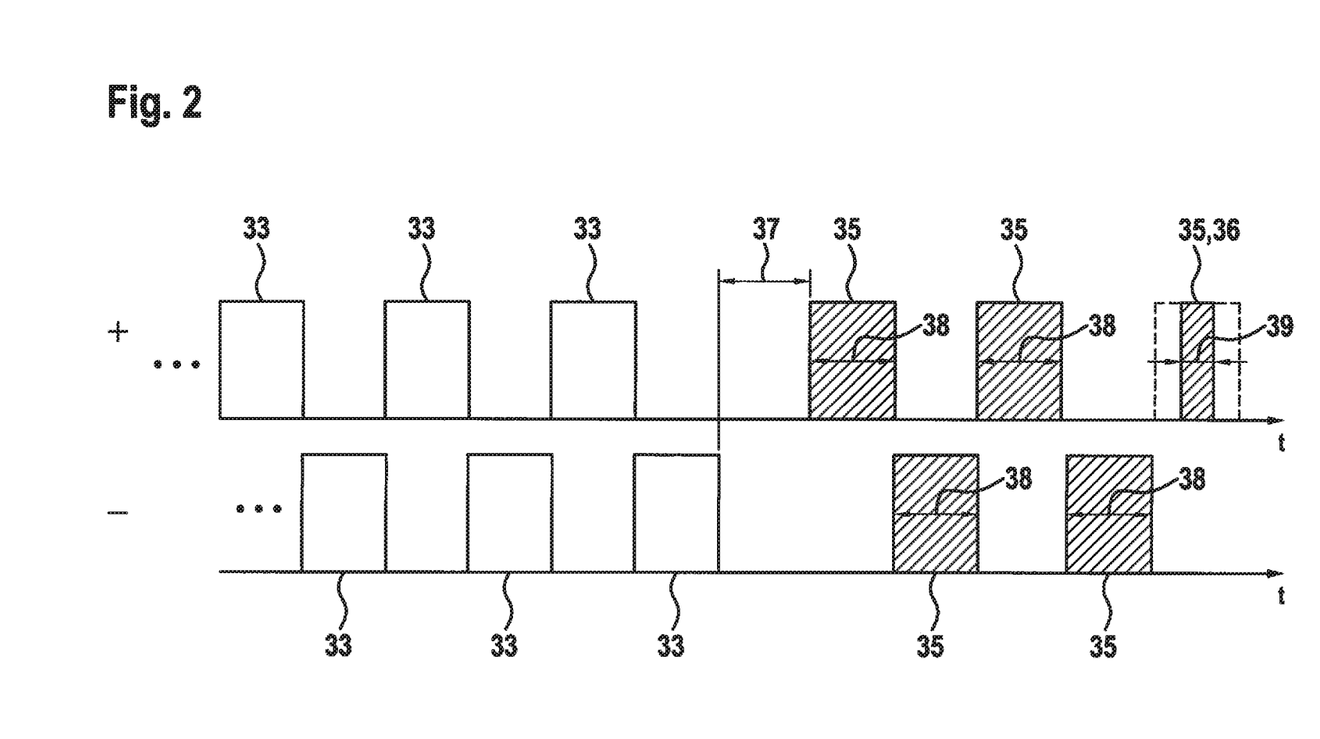
FIG. 2 schematically shows a sequence of control pulses, followed by a sequence of counter control pulses in the time characteristic thereof.

In a graph, FIG. 2 schematically shows a sequence of control pulses 33, followed by a sequence of counter control pulses 35 in the time characteristic thereof, including time t plotted on the abscissa. It is readily discernible that the beginning of first counter control pulse 35 is delayed by a time offset 37 relative to the end of last control pulse 33, whereby the phase position of the sequence of counter control pulses 35 is defined relative to control pulses 33. At the same pulse height of individual counter control pulses 35, the damping energy of the sequence of counter control pulses 35 is determined by pulse width 38. To adjust the damping energy, in particular pulse width 39 of last counter control pulse 36 is decreased around the central position of last counter control pulse 36.

Figure 3:
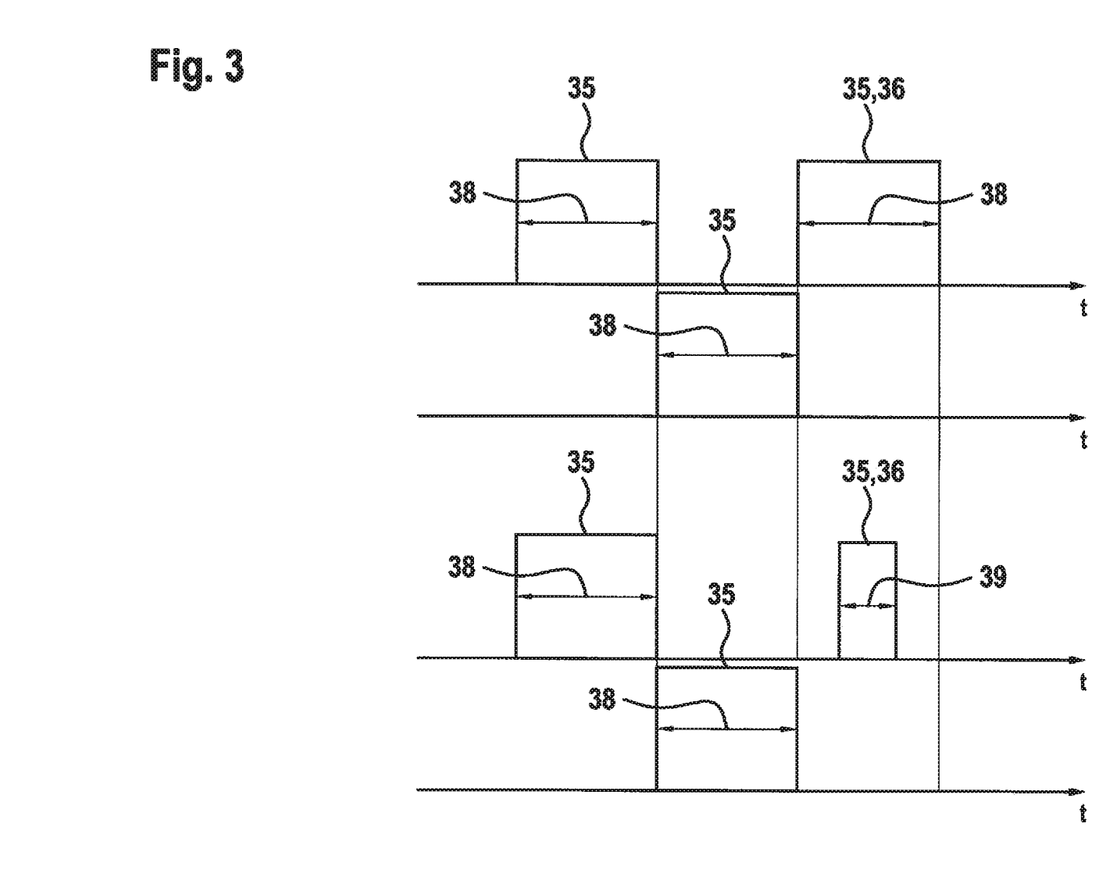
FIG. 3 schematically shows sequences of counter control pulses having different damping energy, adjusted as a function of the pulse width of a final counter control pulse.

FIG. 3 schematically shows a graph that includes sequences of counter control pulses 35 having different damping energy, adjusted as a function of pulse width 39 of a final counter control pulse 36. Plotted in each case on the abscissa is time t. In the upper portion of FIG. 3, pulse widths 38 of preceding contour control pulses 35 and pulse width 39 of final contour control pulse 36 are identical; on the other hand, in the lower portion of the figure, pulse width 39 of final contour control pulse 36 is halved.

Figure 4:
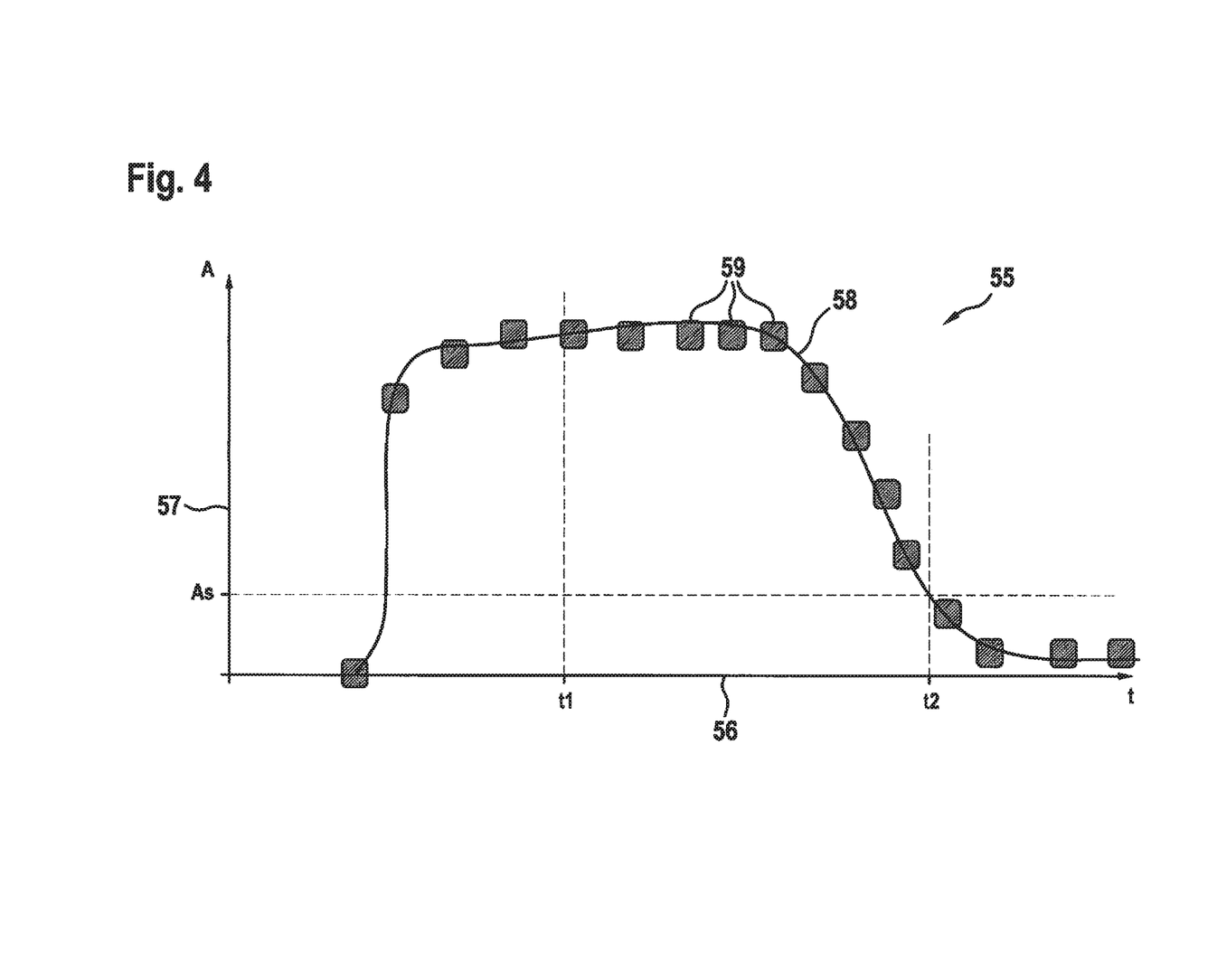
FIGS. 4 and 5 show graphs for computing a measure of the damping success.
Figure 5:
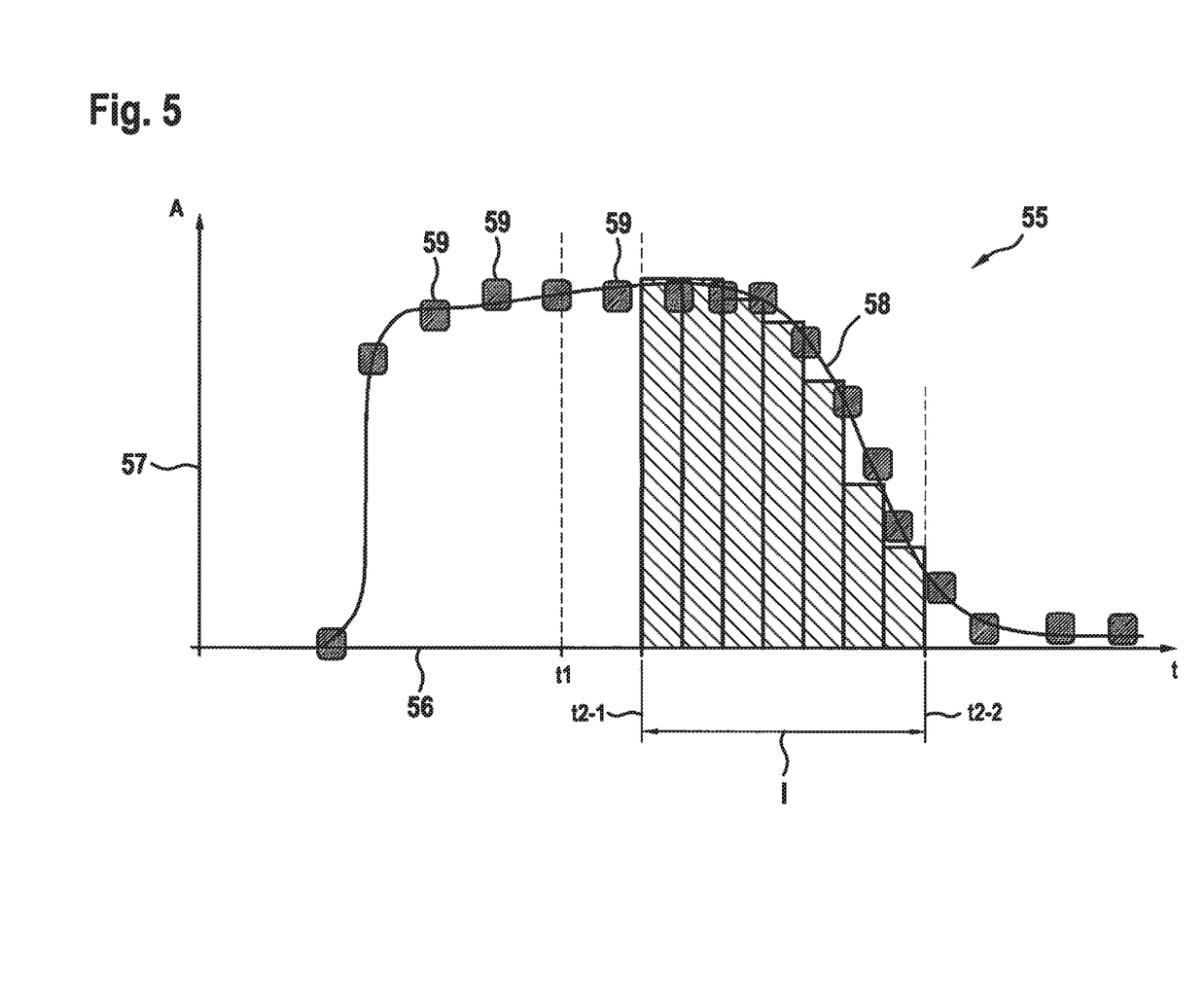

FIGS. 4 and 5 show graphs 55 for computing a measure of the damping success.

In connection with FIG. 4, the damping success is assessed by a threshold value method. Time t is plotted on abscissa 56, and a measure of amplitude A of the oscillatory system of ultrasonic transducer 30 is plotted on ordinate 57. A trace 58 including individual measuring points 59 is shown in each case. Instant t1 characterizes the temporal end of last transmit pulse 33. Instant t2 characterizes amplitude A undershooting a predefined threshold value As.

In graph 55 in accordance with FIG. 5, reference is not made to a threshold value As for amplitude A, rather to an integral value I underneath trace 58 between a starting instant t2-1 and an ending instant t2-2 of the integration and after end t1 of last transmit pulse 33.

Figure 6:
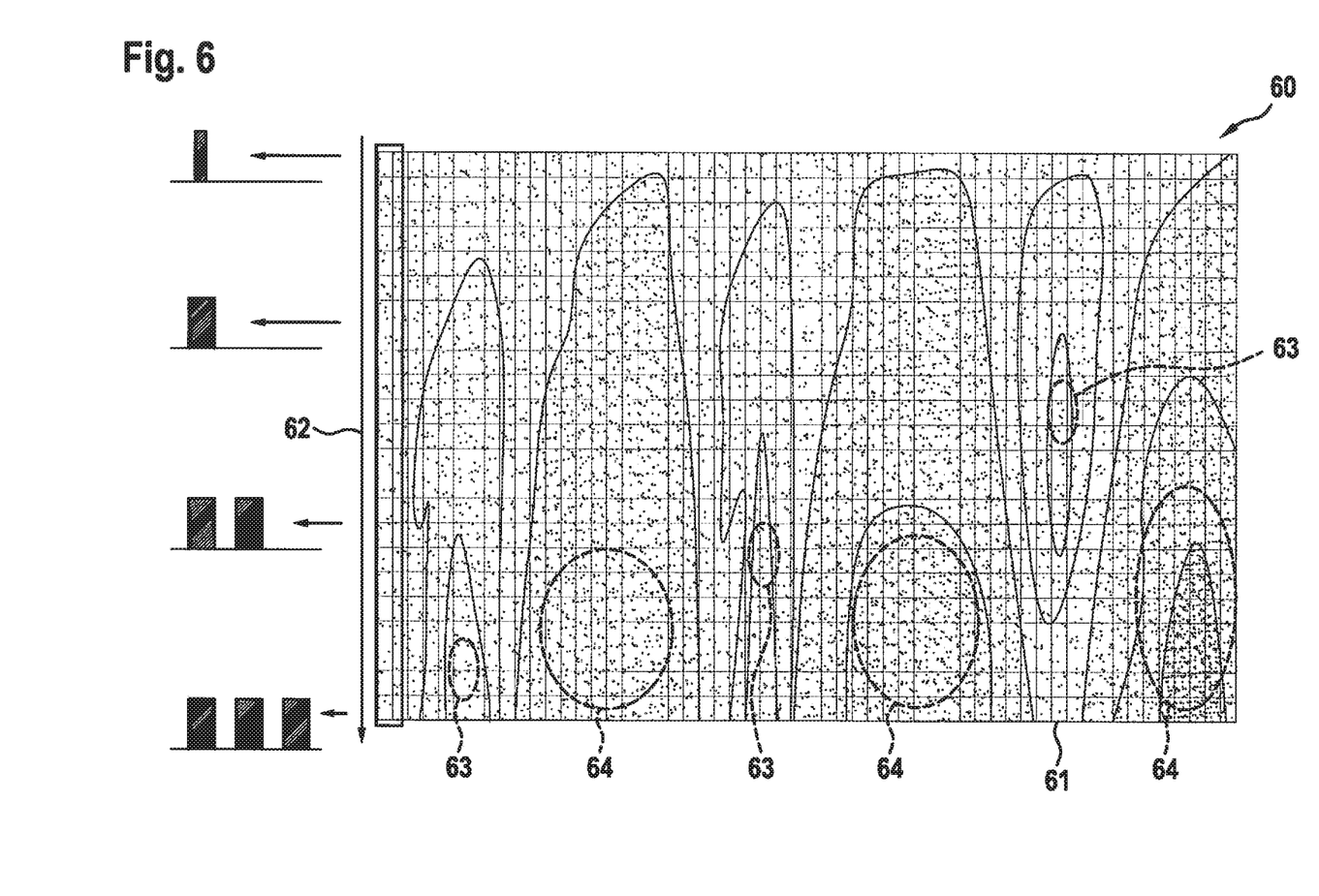
FIG. 6 shows a graph for illustrating the damping success in the context of the active damping in accordance with the present invention.

FIG. 6 shows a graph 60 for illustrating the damping success in the context of the active damping in accordance with the present invention.

The value of offset 37 is plotted in microseconds on abscissa 61, and the damping energy is plotted in the direction of arrow, thus downwards. Apparent in the entire parameter space are domains 63 of optimal damping, as well as domains 64 of unsuitable damping.

Figure 7:
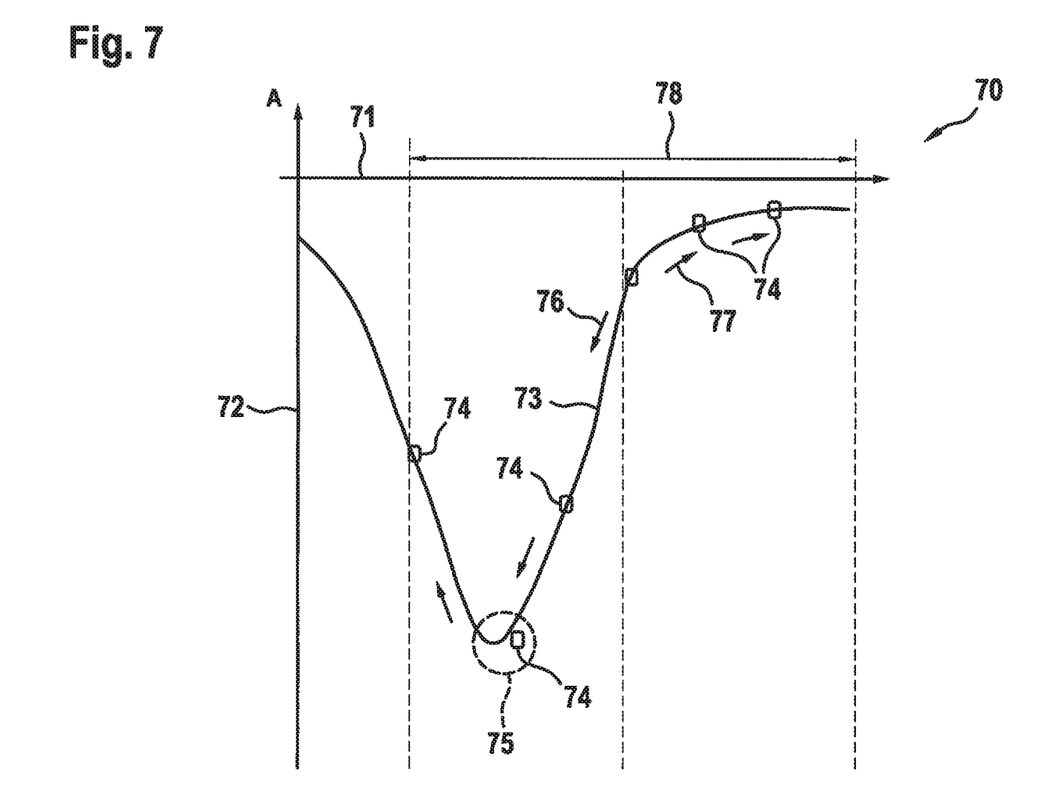
FIGS. 7 through 9 show graphs for illustrating a specific training algorithm.
Figure 8:
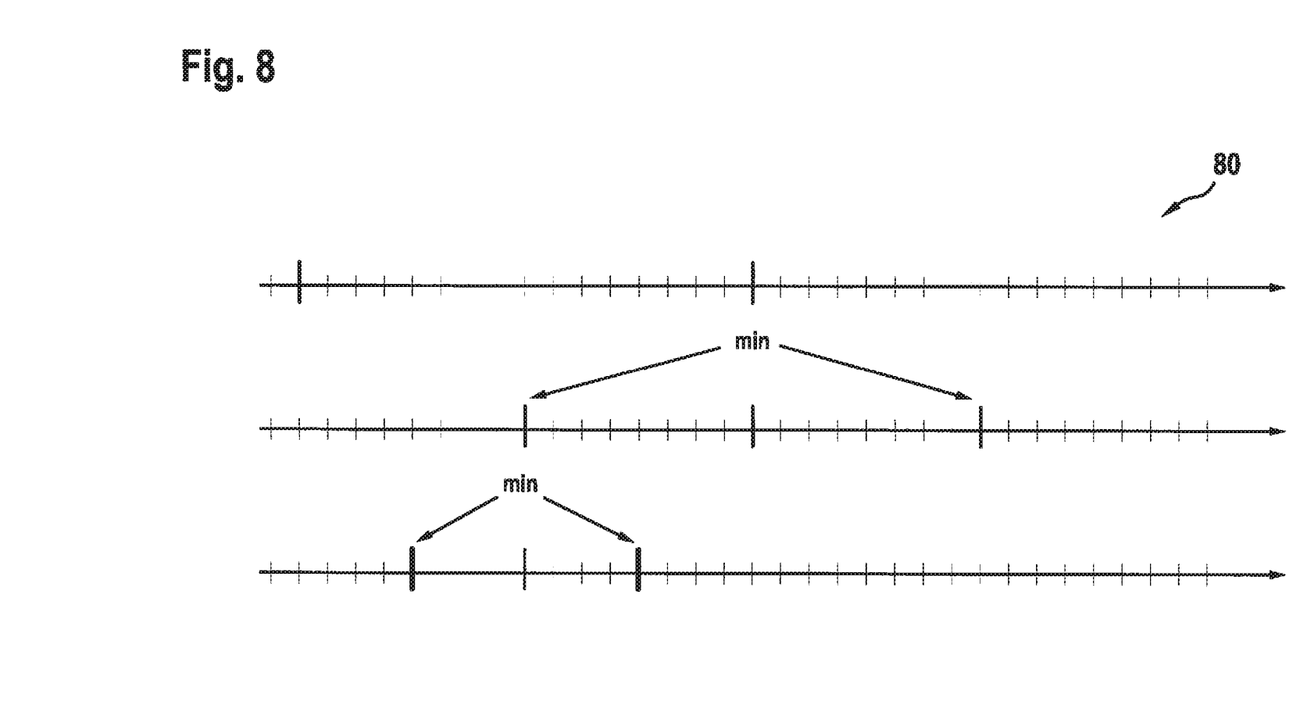
Figure 9:
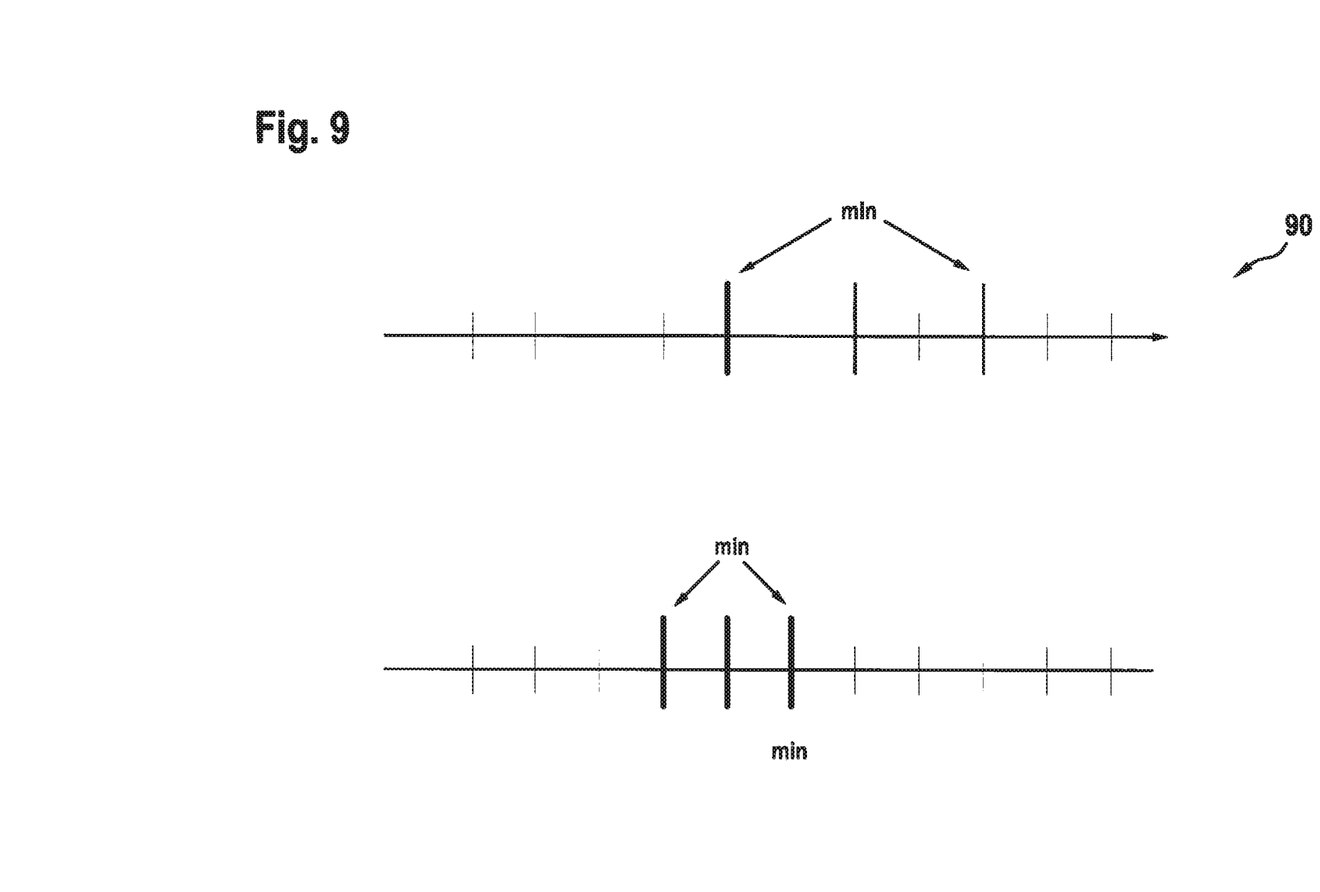

FIGS. 7 through 9 show graphs 70, 80 and 90 for illustrating a specific training algorithm.

In FIG. 7, graph 70 including offset 37 plotted on abscissa 71 and the amplitude of the oscillatory system of ultrasonic transducer 30 plotted on ordinate 72 shows a trace 73 including individual measuring points 74 including a domain 75 in the parameter space, which corresponds to a minimum of amplitude A and thus an optimum of the damping. The directions of arrows 76 and 77 indicate possible directions of the optimization in response to a change in offset 37 during training, starting from a starting value.

FIGS. 8 and 9 illustrate the energy search using interval halving, respectively the fine adjustment of offset and energy, as explained further below in detail.

In this training method shown in FIG. 7 through 9, the search in a first phase is for a valley position of the amplitude, thus a minimum, and for a corresponding value for the offset that leads to this minimum. A specified search range 76 in the form of a search window having a variation range of +−4 or 6 μs, for example, is initially run through in steps of 2 μs, there being a break following a two-time rise or increase in amplitude A in a direction of the change in the offset.

In a second phase, an optimizing energy is sought using interval halving, i.e., by adapting pulse width 39 of a final counter control pulse 36 in accordance with FIGS. 2 and 3. This is achieved by an interval halving of up to 4 μs. At 4 μs, the second pass is only optionally run through.

In a third phase, offset 37 is fine-tuned, namely using conditional steps of a 2 μs increment and conditional steps of a 1 μs increment in the changing of offset 37.

Finally, in a fourth phase of the training, the damping energy is finely adjusted, initially using conditional steps of a 2 μs increment, in which pulse width 39 of final counter control pulse 36 that determines the damping energy, and then using conditional steps of a 1 μs increment in the changing of the damping energy.

As a fifth step, validation is carried out without active damping, optionally by resetting the values of the damping energy to a minimum.

Figure 10:
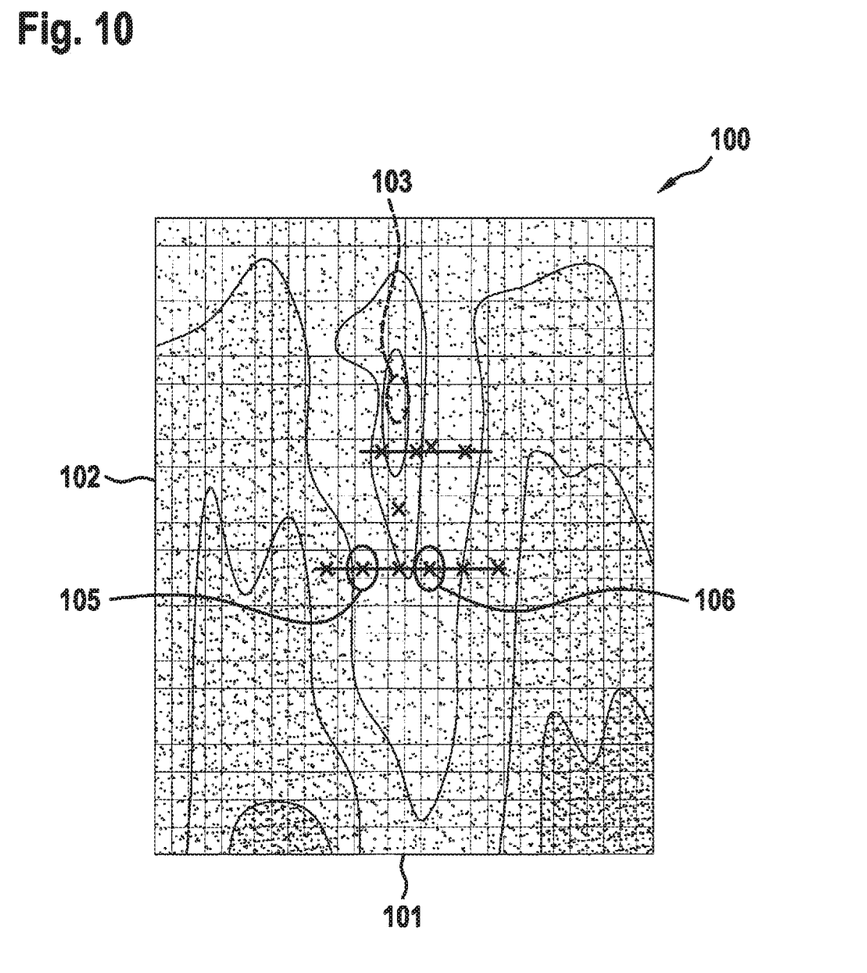
FIG. 10 schematically illustrates aspects of a training algorithm including various starting values for damping energy and offset.

In a graph 100, including offset 37 plotted on abscissa 101 and the damping energy plotted on ordinate 102, FIG. 10 schematically illustrates aspects of a training algorithm including various starting values 105 and 106 for the damping energy, respectively offset 37. Shown again is a domain 103 in the parameter space which corresponds to an optimum for the damping.

Figure 11:
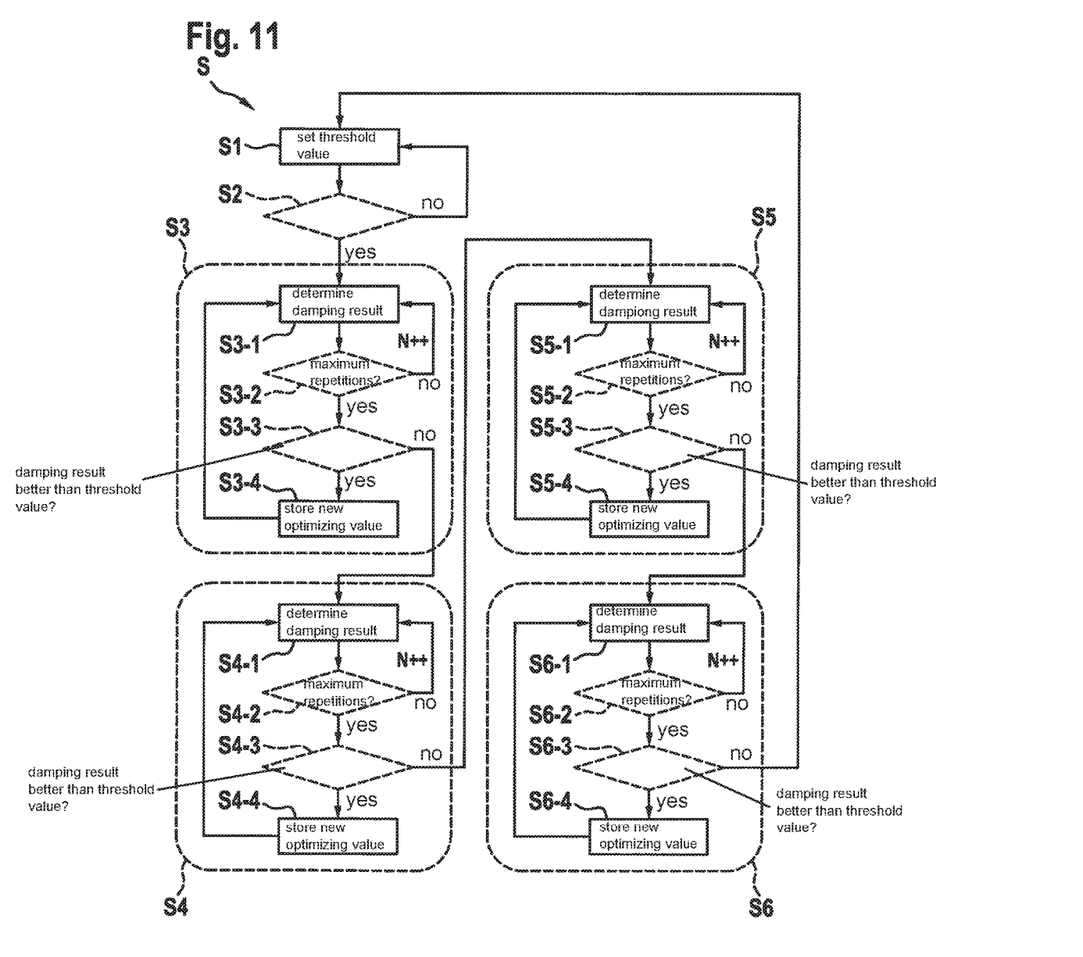
FIG. 11 illustrates a specific embodiment of the control operation, as a type of flow chart.

As a type of flow chart, FIG. 11 illustrates a specific embodiment of a method S for the control operation.

Besides setting S1 of a threshold value for the damping result, this method S includes successive steps S3 through S6 of an offset adaptation and of an energy adaptation, each including positive and negative incrementation of the particular parameter offset or damping energy. In a first partial step S3-1, S4-1, S5-1, S6-1, the damping result is thereby determined in the case of positive or negative incrementation using a specified increment. In a next step S3-2, S4-2, S5-2, S6-2, it is checked whether the number of repetitions corresponds to a maximum number of repetitions. If this is not the case, an adaptation is made once more. If the maximum number of cycles is reached, it is checked in respective step S3-3, S4-3, S5-3, S6-3 whether the damping result is better than a desired threshold value. If this is the case, the offset or the corresponding energy leading to the optimal damping result is then stored as a new optimizing value in a subsequent step S3-4, S4-4, S5-4, S6-4. Otherwise, the switch is made in the preceding step to the next processing step, i.e., from S3 to S4, from S4 to S5, from S5 to S6, respectively from S6 to S1.

These and other features and properties of the present invention are clarified in greater detail with reference to the following explanations:

Due to the decay of the sensor element, understood as an oscillatory element 30 of an ultrasound transceiver device 1, it is not possible to detect objects in environment 50 of a working apparatus equipped with an ultrasound transceiver device 1, for example, a vehicle, immediately after a transmission control.

A dead time results therefrom, in which objects 53 placed in very close proximity to sensor 30 are not detectable. The length of the decay phase of sensor 30 thereby determines the length of the dead time.

Active damping may be used to shorten the decay phase and thus the unusable dead time for a sensor 30.

The phase position of what is generally referred to as the counter control pulses, as damping pulses, is very important for the success of the active damping. It must be 180° for a maximum damping success. Only slight deviations in the phase position thereby lead to a loss of the damping success.

Besides the phase position, the supplied damping energy is likewise decisive for the damping success. A too high damping energy leads to a decay; a too low damping energy to an insufficient damping.

Thus, an effective damping necessitates an exact adjustment of the two parameters, damping energy and phase position, of the counter control pulses.

A precise setting of the parameters may be achieved by explicitly determining the phase and amplitude of the oscillation to be damped and by using these values to produce an instantaneous counter oscillation. In accordance with the present invention, these known measures, which are used, for example, for active noise cancellation headsets or similar devices, are to be avoided due to the expenditure thereof for process engineering and equipment.

In the case of ultrasonic transducers 30 in the motor vehicle sector, transformers are used to generate the transmission voltages. They require an electrical connection, which is also known as a parallel resonant circuit. A consequence of this connection is that the phase and the amplitude of the mechanical oscillation are not determinable by the receiving circuit, and the above methods for generating the counter oscillation are not applicable.

Specifying a defined opposite phase and opposite amplitude as a function of the excitation frequency likewise fails since, depending on the manufacturing, sensors 30 have a different damping and natural frequency and, in response to the excitation, a transition to this natural frequency takes place. Moreover, the natural frequency and damping are temperature dependent and change during operation.

It is an object of the present invention to provide a method for the operation of ultrasound transceiver devices 1 having actively damped ultrasonic sensors 30 that are particularly effective without knowledge of the phase and amplitude of the oscillation to be damped.

A core aspect of the present invention is (a) the type of counter control with regard to the desired damping energy, as well as (b) the specification of a training operation and of a control operation S including determination of the parameters, damping energy and phase position, which make it possible to ensure a damping optimum over the entire operating time and service life of an underlying sensor.

As was explained above for the damping optimum, the counter phase position and the supplied counter control pulses must be set.

It is desirable for the operation that these physical quantities be represented by linear measurement values or parameters to be able to uniquely attribute the damping success to a specific combination of parameters.

The damping energy may be varied by adapting
(a) the number of counter damping pulses;
(b) the duration of the counter damping pulses; and/or
(c) the control current of the counter damping pulses.

It is desirable for the description of the parameter space to generate a measurement value that is linearly dependent on the damping energy; thus, for example, to keep the number of pulses the same and only modify the control current.

A combination of (a) and (b) may be particularly advantageous and is also more readily realized than a current control.

The duration of the counter damping pulses is modified in such a way that the pulse width of the last counter pulse is adjusted around the mid-position up to a maximum pulse width, as shown in connection with FIGS. 2 and 3.

The maximum pulse width is determined by the period of the counter control frequency, which is defined by a target parameter. Thus, as the pulse width decreases, less damping energy is supplied. If the damping energy is to be reduced still further, the last pulse is omitted in the scheme, and the pulse width of the formerly next-to-last pulse is varied accordingly.

The procedure may be continued until pulse width "0."

To obtain a linear measurement value for the damping energy, the total duration of the pulse widths of all counter control pulses is used.

The phase position of the first counter control pulse may be illustrated by a time measured in microseconds, the time difference between the start of the counter control pulse and the end of the last control pulse being definable from a transmit phase.

The phase positions of the subsequent counter control pulses may be similarly characterized. Thus, the result is a multi-dimensional parameter space.

To keep the parameter space and, thus, the complexity of the method to a minimum, it is also possible that only the phase position of the first counter control pulse be varied and that the phase relations among the counter control pulses be kept constant.

The result is only two parameters.

Damping Success

The damping success may be determined by measuring the duration of the post-pulse oscillation as a function of an undershooting of a specifically predefined and optionally fixed threshold.

This approach has the disadvantage that the decay may be superimposed by the echo from object 53 when an object 53 is located in the vicinity of an underlying sensor 30.

For this case, the undershooting of a predefined threshold no longer characterizes the post-pulse oscillation, and the damping success is not measurable.

Therefore, it is more advantageous to ascertain the damping success by determining an integral of the oscillation amplitudes in an interval in the proximity of the post-pulse oscillation optimum to be expected, as illustrated in connection with FIGS. 4 and 5.

If an object echo resides in this interval, the damping success may nevertheless be determined since the post-pulse oscillation amplitudes are added to the object echo amplitudes.

The damping success may be depicted as a function of the offset characterizing the phase, referred to in the following as the parameter "offset," and of the damping energy, referred to in the following as the parameter "energy," as clarified in the representation of FIG. 6.

It is discernible that the damping optima occur only in response to a suitable combination of offset and energy.

Training Phase

The temperature dependence and component dependence require that the damping parameters be newly determined each time an operation is started. This may be achieved by varying the parameters in the entire solution space and thereby determining the damping success. To keep the number of tests, thus the number of transmit pulses as low as possible, the training is performed in different steps or phases, including, for example, the steps of
(a) rough training for the offset;
(b) rough training for the energy;
(c) fine adjustment for the offset;
(d) fine adjustment for the energy; and
(e) validation of the ascertained values for the offset and energy without active damping.

The basic idea of the algorithm is to vary each parameter individually and to modify the same in a first step, to begin with in large increments and beginning with an initial starting parameterization; then, in a second step, to precisely adjust both parameters in small increments; and to subsequently compare the damping success without active damping, as is explained in connection with FIG. 7 through 10.

Rough Training/Coarse Adjustment

For the rough training of offset, the parameter, offset, is varied in large steps, typically of 2 to 6 microseconds, within a predefined interval. Following each pass, the damping success is thereby calculated and compared with the previous result.

Proceeding from the initial starting value, the parameter is first varied in one direction—for example, toward larger values. If after two or a different defined finite number of steps, no damping result is established, the parameter is modified in the other direction, thus, for example, toward smaller values, and the damping result is ascertained.

The process is repeated in one direction until, after two successive steps, there is no further improvement in the damping success, or the predefined interval limit for the parameter is reached.

The setting of the parameter having the greatest damping success is stored.

A similar procedure is followed for the rough training of the parameter energy.

Alternatively, the parameter setting of the greatest damping success may be ascertained using the interval halving method. To that end, three tests are always carried out in accordance with the parameter combination EO-x, E0, Eo+x. The damping success is determined in each case and, subsequently thereto, the parameter location having the greatest damping success of the method is repeated with a halved increment x/2. These steps are repeated until a predefined increment is reached.

Following steps (a) and (b) of the coarse adjustment, the parameter range for the greatest damping success is limited, and the fine adjustment may be begun.

Fine Adjustment

In this regard, the procedure is carried out for the parameters, energy and offset, up until a predefined minimum increment, as in step (b) using interval halving.

Check Test

At the end of steps (a) through (d), the damping success is compared to a setting without active damping to determine the overall success.

As a function thereof, it may be decided to operate the sensor even without active damping.

FIG. 10 shows exemplarily the parameter combinations run through in the training.

The training may either take place upon restart of the system in the vehicle or also during the operation.

A training at start-up prior to the actual measurement operation is especially advantageous since it makes it possible to ensure the full working capacity of sensor 30.

For this, the sequence described above for each sensor 30 may be individually initiated in the system and run through in a rapid sequence of passes—for example, every 2 to 5 ms.

If sensor 30 is run through using transmit pulses of different frequency encoding, it is also beneficial to carry out a training for each transmit pulse type. Optionally, a computation method may transfer the parameter combination from one to the other transmit pulse type.

Control Phase/Control Operation

Because of the temperature dependence, the damping parameters must not only be checked at operation start, but also during the measurement operation, and be optionally adapted.

To that end, both parameters are modified using very small increments. For example, using a smallest possible setting of less than 1 microsecond, for example, the damping success is determined and, optionally adapted in response to a greater damping success.

To be as insensitive as possible to short-duration perturbations, the parameter combination to be checked is repeatedly measured in a predefined number of runs or passes, and, only upon achieving a significant improvement, is the newly defined parameter combination stored as a new optimum.

The variation follows step by step, i.e., initially only the parameter, offset, is slightly incremented and consequently measured several times. If this new parameter combination leads to a greater damping success, then the parameter, offset, is further incremented in this direction, and the process is repeated until there is no further improvement in the damping success. If no damping success is ascertainable, the parameter is decremented, and the method is run through accordingly.

Once the offset has been checked and adapted as a parameter during damping, the procedure is similarly followed during damping using the energy as a parameter.

After the entire loop is run through, the process is repeated, and the control loop begins again.

In addition to the figures, the following is noted:

FIGS. 2 and 3 describe the counter control during active damping. Once the excitation has ended, the oscillation is damped by counter control pulses. The phase position of the counter control pulses is determined by the time difference between the end of the control and the beginning of the counter control. The damping energy is derived from the sum of the pulse widths of the counter control pulses, the last pulse being varied in each case in the pulse width thereof.

FIGS. 4 and 5 clarify the possible computation schemata for the damping success. In accordance with FIG. 4, this is accomplished by measuring the duration of the post-pulse oscillation as a function of an undershooting of a predefined threshold. In accordance with FIG. 5, this is accomplished by integral binding.

In graph 60, FIG. 6 describes the damping success as an optimum or minimum; in the case of active damping, as a function of the damping energy, plotted on ordinate 62 and of the time offset in microseconds, plotted on abscissa 61. Encircled areas 63 identify the optima or minima with a high measure of damping success; areas 64 located therebetween near the abscissa show a low measure of damping success.

FIG. 7 through 9 illustrate a specific embodiment of the training algorithm according to the present invention for training the damping parameters, energy and offset.

In connection with a graph 100, FIG. 10 illustrates the parameter combinations run through in a training, in the training algorithm for the parameters, energy and offset, with starting values 105 and 106 for the offset and for the energy, respectively.

FIG. 11 schematically shows a method S and an algorithm for the control operation.

What is claimed is:

1. An operating method for an ultrasound transceiver device, the method comprising the following steps:
  alternately operating the ultrasound transceiver device in a transmit mode and in a receive mode;
  subsequently to the transmit mode, actively damping the ultrasound transceiver device by an action of a sequence of counter control pulses;
  iteratively determining or adapting a phase position of the sequence of counter control pulses via a training operation in such a way that a measure of a damping success at least temporarily assumes or approaches an at least locally optimal value,
  wherein the training operation is performed by at least one of: (i) by specifying or adapting the phase position as a damping parameter, initially by a coarse adjustment, or (ii) by specifying or adapting the phase position as a damping parameter through interval halving in a search window within a particular parameter range, or (iii) by specifying or adapting the phase position as a damping parameter in a fixed adaptation direction, initially by positive or negative incrementation and, subsequently, by negative or positive incrementation in a search window within the particular parameter range; or (iv) by determining and checking a measure of the damping success following each specification or adaptation of the phase position as a damping parameter, wherein the measure of the damping success is ascertained by determining an integral below an oscillation signal or of an envelope of the oscillation signal of the ultrasound transceiver device, from a starting instant up to an ending instant, at which value of the oscillation signal or of the envelope is below a predefined threshold value.

2. The operating method as recited in claim 1, where the phase position of the sequence of counter control pulses is determined or adapted by specifying or adapting a time interval between an end of a control pulse of the transmit mode that is last to be emitted and a beginning of an immediately following counter control pulse.

3. The operating method as recited in claim 1, further comprising:

iteratively determining or adapting a damping energy of the sequence of counter control pulses, where the damping energy is determined or adapted by specifying or adapting at least one of a number, a duration or an amplitude of the counter control pulses to be output during active damping.

4. The operating method as recited in claim 3, where the damping energy is determined or adapted by specifying or adapting a pulse width of the counter control pulse that is last to be emitted during active damping.

5. The operating method as recited in claim 4, where, in response to a disappearance of a counter control pulse that is the last to be emitted, the pulse width is reduced during active damping, the damping energy is further determined or adapted by specifying or adapting a pulse width of a counter control pulse that is the next-to-last to be emitted.

6. The operating method as recited in claim 1, wherein the measure of the damping success is determined over a time interval from an instant of an end of a last control pulse until an instant an amplitude of oscillation decays below a predefined threshold value.

7. The operating method as recited in claim 1, wherein the measure of the damping success is determined over a time interval from an instant of an end of a last control pulse until an instant an amplitude of oscillation decays below a predefined threshold value.

8. A control apparatus for an ultrasound transceiver device that is configured to operate an ultrasound transceiver device, the control apparatus configured to:

alternately operate the ultrasound transceiver device in a transmit mode and in a receive mode;

subsequent to the transmit mode, actively damp the ultrasound transceiver device by an action of a sequence of counter control pulses;

iteratively determine or adapt a phase position of the sequence of counter control pulses via a training operation in such a way that a measure of a damping success at least temporarily assumes or approaches an at least locally optimal value, wherein the training operation is performed by at least one of: (i) by specifying or adapting the phase position as a damping parameter, initially by a coarse adjustment, and/or or (ii) by specifying or adapting the phase position as a damping parameter through interval halving in a search window within a particular parameter range, and/or or (iii) by specifying or adapting the phase position as a damping parameter in a fixed adaptation direction, initially by positive or negative incrementation and, subsequently, by negative or positive incrementation in a search window within the particular parameter range; and/or or (iv) by determining and checking a measure of the damping success following each specification or adaptation of the phase position as a damping parameter, wherein the measure of the damping success is ascertained by determining an integral below an oscillation signal or of an envelope of the oscillation signal of the ultrasound transceiver device, from a starting instant up to an ending instant, at which value of the oscillation signal or of the envelope is below a predefined threshold value.

9. The operating method as recited in claim 1, wherein the training operation is performed: at a first start of the ultrasound transceiver device, and/or at a renewed start following an interruption of operation or following an operating pause of the ultrasound transceiver device.

10. The operating method as recited in claim 9, wherein the phase position is readjusted as a damping parameter in a control operation following the training operation and during operation of the ultrasound transceiver device.

11. The control apparatus as recited in claim 8, wherein the measure of the damping success is ascertained by determining an integral below an oscillation signal or of an envelope of the oscillation signal of the ultrasound transceiver device, from a starting instant up to an ending instant, at which value of the oscillation signal or of the envelope is below a predefined threshold value.

12. An ultrasound transceiver device comprising a control device for an ultrasound transceiver device that is configured to operate an ultrasound transceiver device, the control device configured to:

alternately operate the ultrasound transceiver device in a transmit mode and in a receive mode;

subsequent to the transmit mode, actively damp the ultrasound transceiver device by an action of a sequence of counter control pulses;

iteratively determine or adapt a phase position of the sequence of counter control pulses via a training operation in such a way that a measure of a damping success at least temporarily assumes or approaches an at least locally optimal value, wherein the training operation is performed by at least one of: (i) by specifying or adapting the phase position as a damping parameter, initially by a coarse adjustment, or (ii) by specifying or adapting the phase position as a damping parameter through interval halving in a search window within a particular parameter range, or (iii) by specifying or adapting the phase position as a damping parameter in a fixed adaptation direction, initially by positive or negative incrementation and, subsequently, by negative or positive incrementation in a search window within the particular parameter range; or (iv) by determining and checking a measure of the damping success following each specification or adaptation of the phase position as a damping parameter, wherein the measure of the damping success is ascertained by determining an integral below an oscillation signal or of an envelope of the oscillation signal of the ultrasound transceiver device, from a starting instant up to an ending instant, at which value of the oscillation signal or of the envelope is below a predefined threshold value.

13. A vehicle, comprising:
an ultrasound transceiver device for recording an environment of the vehicle; and
a control apparatus configured to operate an ultrasound transceiver device, the control apparatus configured to:
  alternately operate the ultrasound transceiver device in a transmit mode and in a receive mode;
  subsequent to the transmit mode, actively damp the ultrasound transceiver device by an action of a sequence of counter control pulses;
iteratively determine or adapt a phase position of the sequence of counter control pulses via a training operation in such a way that a measure of a damping success at least temporarily assumes or approaches an at least locally optimal value,
wherein the training operation is performed by at least one of: (i) by specifying or adapting the phase position as a damping parameter, initially by a coarse adjustment, or (ii) by specifying or adapting the phase position as a damping parameter through interval halving in a search window within a particular parameter range, or (iii) by specifying or adapting the phase position as a damping parameter in a fixed adaptation direction, initially by positive or negative incrementation and, subsequently, by negative or positive incrementation in a search window within the particular parameter range; or (iv) by determining and checking a measure of the damping success following each specification or adaptation of the phase position as a damping parameter,
wherein the measure of the damping success is ascertained by determining an integral below an oscillation signal or of an envelope of the oscillation signal of the ultrasound transceiver device, from a starting instant up to an ending instant, at which value of the oscillation signal or of the envelope is below a predefined threshold value.

* * * * *